(12) United States Patent
Rosqvist (10) Patent No.: US 9,251,398 B2
(45) Date of Patent: *Feb. 2, 2016

(54) METHOD OF MATCHING, BIOMETRIC MATCHING APPARATUS, AND COMPUTER PROGRAM

(71) Applicant: Precise Biometrics AB, Lund (SE)

(72) Inventor: Fredrik Rosqvist, Malmo (SE)

(73) Assignee: Precise Biometrics AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,391

(22) Filed: Apr. 8, 2014

(65) Prior Publication Data

US 2014/0233812 A1 Aug. 21, 2014

Related U.S. Application Data

(63) Continuation of application No. 13/405,577, filed on Feb. 27, 2012, now Pat. No. 8,731,251.

(60) Provisional application No. 61/450,305, filed on Mar. 8, 2011.

(30) Foreign Application Priority Data

Mar. 2, 2011 (EP) .................................... 11156610

(51) Int. Cl.
*G06K 9/00* (2006.01)
*G06K 9/68* (2006.01)

(52) U.S. Cl.
CPC .......... *G06K 9/00093* (2013.01); *G06K 9/6892* (2013.01)

(58) Field of Classification Search
CPC ... G06K 9/00093; G06K 9/6892; G06K 9/54; G06K 9/00087; A61B 5/1172; G07C 9/00087

USPC .................. 382/125, 124, 219, 190, 291, 294
See application file for complete search history.

(56) References Cited

U.S. PATENT DOCUMENTS 5,613,014 A * 3/1997 Eshera et al. ................. 382/124
2006/0045350 A1 * 3/2006 Itoh et al. ...................... 382/209

(Continued)

FOREIGN PATENT DOCUMENTS

| EP | 2237226 | 10/2010 |
|---|---|---|
| GB | 2050026 | 12/1980 |
| WO | 9612246 | 4/1996 |

OTHER PUBLICATIONS

Isenor D K et al: "Finger Identification Using Graph Matching", Pattern Recognition, Elsevier, GB, vol. 19, No. 2, Jan. 1, 1986, pp. 113-122.

(Continued)

*Primary Examiner* — Manucheher Rahmjoo
(74) *Attorney, Agent, or Firm* — Renner, Otto, Boisselle and Sklar LLP (57) ABSTRACT

A method of matching fingerprints is disclosed. The method comprises, for a first minutia point, being assigned as a planet minutia point a) determining pairs including the planet minutia point and a satellite minutia point, respectively, such that a cluster is formed; b) comparing the clusters of the respective sets and excluding nonmatching satellites; c) counting links in the cluster formed by remaining pairs; and d) for remaining satellite minutia points, performing steps a) to c) with respective satellite minutia point assigned as planet minutia point to form a supercluster by iterating steps a) to d) and superadding the clusters; calculating a score of the supercluster based on the aggregate counted links; and comparing the score with a threshold. A biometric matching apparatus, a portable data carrier, a data processing unit comprising a matching apparatus and a computer program for implementing the invention are also disclosed.

21 Claims, 5 Drawing Sheets

(56) References Cited

U.S. PATENT DOCUMENTS

2006/0210170 A1     9/2006  Yumoto et al.
2013/0287271 A1*   10/2013  Harper .......................... 382/124

OTHER PUBLICATIONS

Shihua He et al; "Clustering-Based Descriptors for Fingerprint Indexing and Fast Retrieval", Sep. 23, 2009, Computer Vision—ACCV 2009: 9th Asian Conference on Computer Vision, Xi'an, China, Sep. 23-27, 2009; Revised Selected Papers, Berlin [U.A.]: Springer, DE, pp. 354-363.

Omar Hamdoun et al: "Person re-identification in multicamera system by signature based on interest point descriptors collected on short video sequences," Distributed Smart Cameras, 2008, ICDSC 2008. Second ACM/IEEE International Conference on IEEE, Piscataway, NJ, USA, Sep. 7, 2008, pp. 1-6.

Unsang Part et al: "Periocular biometrics in the visible spectrum: A feasibility study", Biometrics: Theory, Applications, and Systems, 2009. BTAS '09. IEEE 3rd International Conference On, IEEE, Piscataway, NJ USA, Sep. 28, 2009, pp. 1-6.

"Exclusive Use Equipment", NEG Research and Development, Nippon Electric Ltd. Tokyo, JP, No. 96, Mar. 1, 1990, pp. 143-159.

European Search Report and Opinion from corresponding European Application No. EP 11 15 6610, dated May 18, 2011.

* cited by examiner

Minutia count:   10              10

Link count:      32              42

METHOD OF MATCHING, BIOMETRIC MATCHING APPARATUS, AND COMPUTER PROGRAM

TECHNICAL FIELD

The present invention generally relates to a method of matching fingerprints to determine if two sets of minutia points of respective fingerprint reading emanates from fingers which are idem, a biometric matching apparatus, a portable data carrier, a data processing unit comprising a matching apparatus, and a computer program.

BACKGROUND

Fingerprint recognition is a growing market hence the need for an ongoing development of increasing the performance as well as reducing the computational complexity in order to achieve efficient match algorithms. By using the minutia points as a characterization of a fingerprint and follow the current standards in how minutia points are defined, e.g. International STANDARD ISO/IEC 19794-2 Information Technology, Biometric data interchange formats Part 2: Finger Minutiae data, (2005), fingerprint matching technology has taken a further step towards mass-market solutions.

Matching two sets of minutia points straight ahead, point by point, is a very difficult task since there is almost always some kind of rotation and/or translation between the sets. This is because the placement of the finger on the sensor is usually not on the exact same position as it might have altered translation or rotation wise. I order to overcome this problem, some kind of alignment procedure could be performed where e.g. a verification set is de-translated and/or de-rotated to be in a similar position as an enrollment set. Once the two sets of minutia points are aligned, the individual minutia points could for example be matched all against all to decide which minutia points match between the two sets. Finally a metric could be calculated based on how many and how well the minutia points actually match. The pre-processing of the data, i.e. de-rotating and de-translating, adds requirements on computational effort. Simultaneously, user demands put swiftness high ranked, which is counteracted by the additional processing.

Isenor et al, "Fingerprint matching using graph matching", University of Toronto, discloses an approach where a fingerprint is encoded in form of a graph, in which nodes represent ridges and edges represent ridge adjacency information. A directed graph is thus defined, where each node in the graph corresponds to one ridge. Edges between nodes are labeled based on the nodes they interconnect. The graphs are partitioned, refined and thereafter scored by tracing a tree in each graph.

WO 96/12246 A1 discloses an image comparison arrangement where fingerprint minutia maps are converted to attributed relation graphs, ARG, including nodes and branches. In the ARG, a comparison tree by which attempts are made to fill a match core with elements representing matching stars. The number of elements in the match core indicates the degree of match.

EP 2237226 A1 discloses an approach for inter-pattern feature correspondence relationships. A proximity feature point group is generated in which feature points are positionally proximate to each other in a pattern and a location relationship number numeric group indicating location relationship between the feature points. The feature point related arrangement relationships numerical value used for matching check of the feature point group arrangements is measured by using a general image coordinate system for a reference coordinate system. A score is derived from the number of corresponding feature points.

GB 2050026 A discloses an approach where minutiae of a fingerprint are combined with counts and density for each feature point selected as a reference feature point. The density is determined in connection with adjacent feature points that are present in a predetermined neighbourhood of the reference feature point. Each count is decided by number of streaks intervening between the reference feature point among the feature points in a predetermined sector of the neighbourhood.

The solutions presented above still are complex and/or resource consuming. It is therefore a desire to provide an improved approach of biometric matching of sets of minutiae.

SUMMARY

An object of the invention is to at least alleviate the above stated problem. The present invention is based on the understanding that a convenient and reliable metric, with smooth granularity, can be achieved by matching pairs of minutia points and building a structure therefrom in which the metric is achieved as the structure is built.

According to a first aspect, there is provided a method of matching fingerprints to determine if two sets of minutia points of respective fingerprint reading emanates from fingers which are idem. The method comprises, for a first minutia point in respective set being assigned as a planet minutia point, a) determining pairs including the planet minutia point and a satellite minutia point, respectively, such that a cluster is formed around the first minutia point in the respective set with the satellite minutia points; b) comparing the clusters of the respective sets which have matching features of the pairs between the sets and excluding non-matching satellites; and c) counting links in the cluster formed by remaining pairs of the planet minutia point and the satellite minutia points. For remaining satellite minutia points, performing a) determining pairs including the planet minutia point and a satellite minutia point, respectively, such that a cluster is formed around the first minutia point in the respective set with the satellite minutia points; b) comparing the clusters of the respective sets which have matching features of the pairs between the sets and excluding non-matching satellites; and c) counting links in the cluster formed by remaining pairs of the planet minutia point and the satellite minutia points with respective satellite minutia point assigned as planet minutia point to form a supercluster. This is iterated and superadding of the clusters of each iteration is performed wherein link count is stored such that an aggregate link count is available after the iteration such that the aggregate link count is achieved as the supercluster is built. The method further comprises calculating a score of the supercluster based on the aggregate counted links; and comparing the score with a threshold, wherein the respective fingerprint readings are considered to emanate from fingers which are idem if the score reaches the threshold.

For remaining satellites, the process may include performing the iterative steps until the formed supercluster reaches a predetermined size or no further minutia points of the sets remain.

The matching features of the pairs may comprise a set of parameters including any of distance between planet minutia point and satellite minutia point; relative angle between planet minutia point and satellite minutia point; and relative angle between a reference angle and an angle of any of the planet minutia point and satellite minutia point, or any combination of these.

The calculation of the score may further comprise calculating a tension parameter of the supercluster and basing the score on the calculated tension parameter.

The calculation of the score may further comprise calculating an area of the supercluster and basing the score on the calculated area.

The calculation of the score may further comprise calculating a mean number of minutia points in the sets and basing the score on the calculated mean number of minutia points.

The calculation of the score may further comprise calculating the number of minutia points in the supercluster and basing the score on the calculated number of minutia.

The score may be calculated as a quota comprising in its numerator a product comprising the number of counted links, the tension parameter and the area of the supercluster, and in its denominator a product comprising the squared mean number of minutia points in the sets and the squared number of minutia points in the supercluster.

The initial planet may be selected close to a centre of the fingerprint reading. The initial planet may additionally or alternatively be selected such that a first cluster comprises as many matching pairs as possible, wherein the method further comprises repeating the first iteration with another planet if a poor match is given for a previous selected initial planet.

According to a second aspect, there is provided a biometric matching apparatus comprising a receiver for receiving a first set of minutia points of a fingerprint reading; a memory access circuit arranged to access a memory holding at least a second set of minutia points of a fingerprint template; and a processing device connected to the receiver and the memory access circuit, and arranged to determine whether the first set of minutia points match the second set of minutia points. This is performed by, for a first minutia point in respective set, being assigned as a planet minutia point a) determine pairs including the planet minutia point and a satellite minutia point, respectively, such that a cluster is formed around the first minutia point in the respective set with the satellite minutia points; b) compare the clusters of the respective sets which have matching features of the pairs between the sets and excluding non-matching satellites; c) count links in the cluster formed by remaining pairs of the planet minutia point and the satellite minutia points; and d) for remaining satellite minutia points, perform a) to c) with respective satellite minutia point assigned as planet minutia point to form a supercluster by iteration of steps a) to d) and superaddition of the clusters of each iteration wherein link count is stored such that an aggregate link count is available after the iteration such that the aggregate link count is achieved as the supercluster is built; calculate a score of the supercluster based on the aggregate counted links; and compare the score with a threshold, wherein the respective fingerprint reading and template are considered to emanate from fingers which are idem if the score reaches the threshold, such that an output indicating whether the fingerprint reading and template match is provided.

The matching features of the pairs may comprises a set of parameters including any of distance between planet minutia point and satellite minutia point; relative angle between planet minutia point and satellite minutia point; and relative angle between a reference angle and an angle of any of the planet minutia point and satellite minutia point, or any combination of these.

For the calculation of the score, the processing device may further be arranged to calculate a tension parameter of the supercluster and base the score on the calculated tension parameter.

For the calculation of the score, the processing device may further be arranged to calculate an area of the supercluster and base the score on the calculated area.

For the calculation of the score, the processing device may further be arranged to calculate a mean number of minutia points in the sets and base the score on the calculated mean number of minutia points.

For the calculation of the score, the processing device may further be arranged to calculate the number of minutia points in the supercluster and base the score on the calculated number of minutia.

The score may be calculated as a quota comprising in its numerator a product comprising the number of counted links, the tension parameter and the area of the supercluster, and in its denominator a product comprising the squared mean number of minutia points in the sets and the squared number of minutia points in the supercluster.

The initial planet may be selected close to a centre of the fingerprint reading. Alternatively or additionally, the initial planet may be selected such that a first cluster comprises as many matching pairs as possible, wherein the processing device is arranged to repeat the first iteration with another planet if a poor match is given for a previous selected initial planet.

According to a third aspect, there is provided a portable data carrier comprising a memory holding a template of a fingerprint represented by a set of minutia points of a reference fingerprint; a matching apparatus according to the second aspect, wherein the memory access means is connected to the memory, arranged to determine if the first set of minutia points and the set of minutia points of a reference fingerprint emanates from idem finger; and a security mechanism arranged to be unlocked upon the output indicating that the fingerprint reading and template match.

According to a fourth aspect, there is provided a data processing unit comprising a matching apparatus according to the second aspect, wherein the accessed memory is a database comprising a plurality of templates for a plurality of fingers, respectively, arranged to determine, from a calculated score for respective of the templates, which of templates that resembles the fingerprint to be checked the most.

The data processing unit may further be arranged to determine if the fingerprint to be checked and the most resembling one of the at least one template emanates from fingers which are idem by comparing the score of the most resembling one of the at least one template with a threshold.

According to a fifth aspect, there is provided a computer program comprising computer executable instructions, which instructions cause a computer to, when downloaded to and executed on a processor of the computer, perform the method according to the first aspect. Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION OF PREFERRED EMBODIMENTS

For the understanding of fingerprint representation and matching, which is the basis for the present invention, some basic facts will be given below, and the concept of the invention will be described by introducing features stepwise for the better understanding of the particulars of the invention, and also the invention as a whole. The effect of respective feature, as well as the effect of the invention as a whole, may become more clear taking the whole disclosure into consideration.

Figure 1:
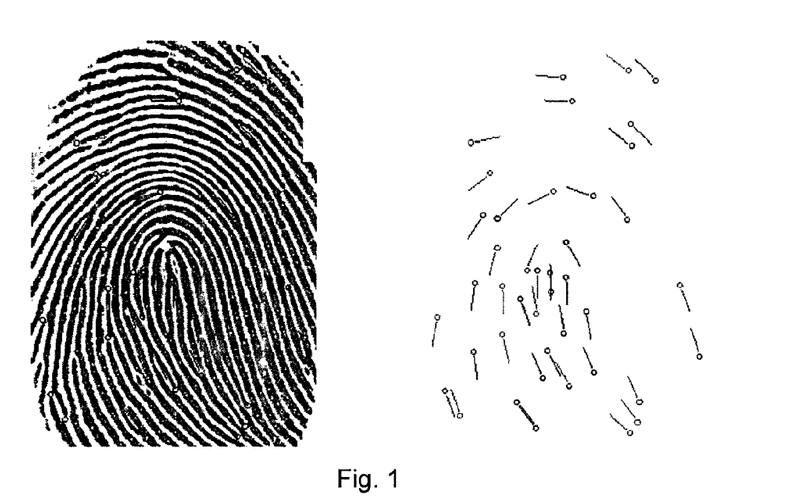
FIG. 1 illustrates an exemplary fingerprint image and exemplary minutiae found in it.
Figure 2:
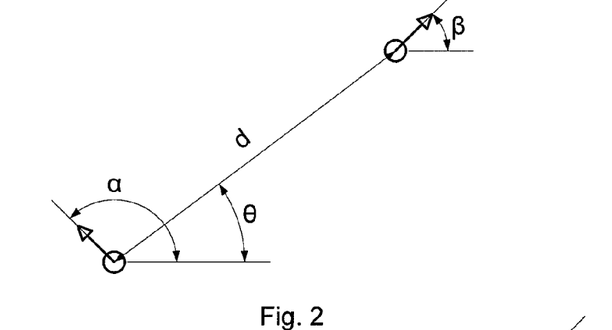
FIG. 2 illustrates a minutiae pair and parameters derivable from it.
Figure 3:
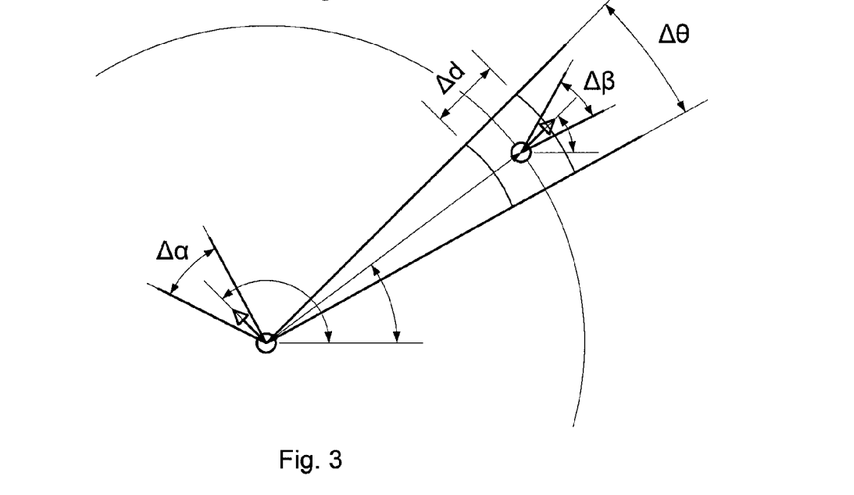
FIG. 3 illustrates a minutiae pair and exemplary tolerances for the parameters when matching with a corresponding minutiae pair.

FIG. 1 illustrates an exemplary fingerprint image to the left and exemplary minutiae found in it, which are separately illustrated to the right. A minutia point can be assigned a parameter set for describing it. The parameter set can comprise the position of the minutia point, here illustrated as the position of the respective circles, e.g. in a coordinate system having its reference to the sensor, or to a reference point determined from the image. The parameter set can also comprise a direction of the minutia, here illustrated as a line in a direction from the respective circles, a type of the minutia, etc. These parameters are known in the art. For speeding up comparison, and/or enabling comparison on devices with limited processing power and/or memory capacity, the parameters used in a biometric application can be limited to a sub-set of these parameters. In the example illustrated in FIG. 2 below indicates a way of reducing the parameter set while maintaining an efficient and reliable representation of features of the fingerprint. In FIGS. 2 and 3, the line illustrating the direction from the circle is enhanced with an arrow to more easily discriminate it from other lines used in the illustration.

Matching two sets of minutia points directly, point by point, causes some problems since there is almost always some kind of rotation and/or translation between a verification set of minutiae with respect to an enrolment set of minutiae. This is because the placement of the finger on a sensor is usually not on the exact same position, and the image has altered by translation and/or rotation. I order to overcome this problem some kind of alignment procedure could be performed where the verification set is de-translated and/or de-rotated to be in a similar position as the enrolment set. Once the two sets of minutia points are aligned, the individual minutia points could for example be matched all against all to decide which minutia points match between the two sets. From this, a score could be calculated based on how many and how well the minutia points actually match. However, the present invention suggests another approach. The inventive approach is based on that only a relative comparison is done where local structures formed from the enrolment set are compared to local structures formed from the verification set. If these local structures are translation and rotation invariant, no specific alignment step is needed. The simplest local structure, which is translation and rotation invariant, is a pair of minutia points, located not too far apart but not too closely spaced either.

FIG. 2 illustrates a minutiae pair and parameters derivable from it. By using two minutia points, parameters of the points can be determined from a relative reference, wherein alignment in sense of translation and rotation will be included in the determination of the pair, and may not need involving any external reference point or coordinate system. In the illustrated minutiae pair, a reference for direction $\alpha$ for the first minutia, direction $\beta$ for the second minutia and angle $\theta$ for the are used, here to the horizontal plane, while a distance d between the points is entirely relative. As an alternative, the direction $\alpha$ for the first minutia and direction $\beta$ for the second minutia may be represented as relative to a line between the points, and then becomes relative, while the angle $\theta$ will be to a reference direction. However, upon comparison between two representations including such pairs, the angle $\theta$ will be different for the comparison sets due to different rotation, and can be excluded by a relative value between the sets. The local structures then become translation and rotation invariant relative to each other. Further, the granularity with which the parameters are represented, preferably digitally represented, may vary depending on the biometric application. Also here, the issue of speeding up comparison, and/or enabling comparison on devices with limited processing power and/or memory capacity may be considered. For example, the directions may be quantised into 16, 32, 64, etc. directions for representing the complete turn by 4, 5, 6, etc. bits. Normally, even if hardware so allows, accuracy is not very much increased by using more than 8 bits for a direction parameter, wherein 8 bits can be seen as a preferred value if the hardware so allows.

These types of pairs form the basic building block used in the following disclosure. It could be mentioned that most alignment algorithms used some kind of local structures to calculate the translation and rotation difference between the two sets of minutia points but in the following disclosure, the matching is performed accordingly.

FIG. 3 illustrates a minutiae pair and exemplary tolerances for the parameters when matching with corresponding minutiae pair. To provide an efficient matching, a certain tolerance enables issues such as quantisation errors, deformation of finger when applying it to sensor and imperfections in sensors to be handled. In FIG. 3, the same parameter set as illustrated in FIG. 2 has been selected for the sake of easier understanding, but as demonstrated above with reference to FIG. 2, the parameters can be defined in other ways. The angle $\alpha$, when comparing with the other set, will be considered equal if the compared minutia has its direction within the range $\Delta\alpha$. Similarly, the angle β, when comparing with the other set, will be considered equal if the compared minutia has its direction within the range Δβ, and the angle θ, when comparing with the other set, will be considered equal if the compared pair has its direction within the range Δθ. Also similarly, the distance d, when comparing with the other set, will be considered equal if the compared pair has its distance within the range Δd.

The deviation parameters Δd, Δα, Δβ and Δθ are mainly used for giving understanding of the principles. The tolerances are of course not necessary to be determined by any such deviation parameters. An example is to observe a differential value between respective pair, i.e. to subtract one parameter from the other and compare the absolute value of the subtraction with a threshold value chosen to give an appropriate tolerance. Such operations are particularly suitable for quick calculations by logic circuitry. Furthermore, to make comparison more invariant to alignment issues, differential values of both the general directions of the minutia points of respective pair can be derived in similar way. For example, the following calculations and checks to threshold values can be made $$|d_s - d_t| < T_d$$

$$|(\beta_s - \alpha_s) - (\beta_t - \alpha_t)| < T_{\alpha\beta}$$

$$|(\beta_s - \theta_s) - (\beta_t - \theta_t)| < T_{\beta\theta}$$

where $d_s$ is distance of the sample pair, $d_t$ is distance of the template pair, $T_d$ is a chosen threshold giving appropriate tolerance in distance, $\beta_s$ is general direction of one minutia point of the sample pair and $\alpha_s$ is general direction of the other minutia point of the sample pair, $\beta_t$ is general direction of one minutia point of the template pair and $\alpha_t$ is general direction of the other minutia point of the template pair, $T_{\alpha\beta}$ is a chosen threshold giving appropriate tolerance in differential value between general directions of the minutia points, $\theta_s$ is a direction between minutia points of the sample pair, $\theta_t$ a direction between minutia points of the template pair, and $T_{\beta\theta}$ is a chosen threshold giving appropriate tolerance in differential value between one of the general directions of the minutia points and a reference direction. In this example, suitable thresholds have been a value corresponding to about a few tenths of a mm for $T_d$, about a few tenths of a radian for $T_{\alpha\beta}$, and about a few tenths of a radian for $T_{\beta\theta}$. These values are preferably fine-tuned for the specific application, used gear, and quantisation used by the logic circuitry. According to an embodiment, the threshold for $T_d$ can be tuned to a value somewhere between 0.5 and 1.0 mm, to a value somewhere between 0.4 and 0.8 radians for $T_{\alpha\beta}$, and to a value somewhere between 0.4 and 0.8 radians for $T_{\beta\theta}$. According to a further embodiment, the threshold for $T_d$ can be tuned to a value somewhere between 0.2 and 0.7 mm, to a value somewhere between 0.4 and 0.8 radians for $T_{\alpha\beta}$, and to a value somewhere between 0.2 and 0.5 radians for $T_{\beta\theta}$. According to a further embodiment, the threshold for $T_d$ can be tuned to a value somewhere between 0.3 and 0.6 mm, to a value somewhere between 0.1 and 0.4 radians for $T_{\alpha\beta}$, and to a value somewhere between 0.2 and 0.5 radians for $T_{\beta\theta}$. According to a further embodiment, the threshold for $T_d$ can be tuned to a value somewhere between 0.2 and 0.5 mm, to a value somewhere between 0.2 and 0.6 radians for $T_{\alpha\beta}$, and to a value somewhere between 0.3 and 0.8 radians for $T_{\beta\theta}$. According to a further embodiment, the threshold for $T_d$ can be tuned to a value somewhere between 0.2 and 0.5 mm, to a value somewhere between 0.2 and 0.5 radians for $T_{\alpha\beta}$, and to a value somewhere between 0.2 and 0.5 radians for $T_{\beta\theta}$. According to a further embodiment, where tight tolerances are preferred, the threshold for $T_d$ can be tuned to 0.1 mm, to a value of about 0.1 radian for $T_{\alpha\beta}$, and to a value of about 0.1 radians for $T_{\beta\theta}$. According to a further embodiment, where tolerances which likely avoid missing a match are preferred, the threshold for $T_d$ can be tuned to about 1 mm, to a value of about 1 radian for $T_{\alpha\beta}$, and to a value of about 1 radians for $T_{\beta\theta}$.

Figure 4:
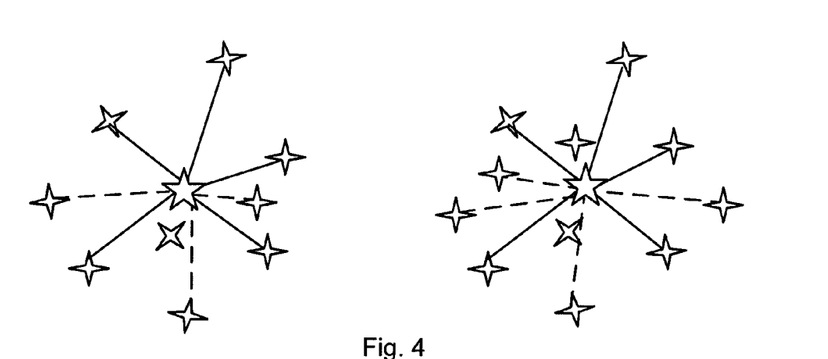
FIG. 4 illustrates two sets of minutiae that are to be compared, and initially building a cluster by forming matching pairs.

FIG. 4 illustrates two sets of minutiae that are to be compared, and initially building a cluster by forming matching pairs. In the illustration, the star-shaped symbols denote representations of minutiae, where position and orientation is indicated. Further, the five-pointed star symbol denotes a selected planet minutia point and the four-pointed star symbols denote its possible satellite minutia points. The left-hand set can be considered as the minutiae representation of a sample and the right-hand set can be considered as the minutiae representation of a template, which sample is to be compared with the template for determining whether a match is present. From the planet minutia point pairs are formed with respective satellite minutia point, as illustrated by respective lines between the planet and satellite minutia points, and the pairs are compared between the sample and the template according to the principles demonstrated with reference to FIGS. 2 and 3. The matching features of the pairs preferably comprises a set of parameters including any of distance between planet minutia point and satellite minutia point, relative angle between planet minutia point and satellite minutia point, and relative angle between a reference angle and an angle of any of the planet minutia point and satellite minutia point, or any combination of these.

Upon the selection of pairs of planet minutia point and satellite minutia point, it is preferred that only pairs having an upper and/or a lower bound in sense of distance between the planet minutia point and satellite minutia point. Choosing pairs having very short distance may cause problems in sense of for example large relative quantisation error of the distance parameter and/or large deviation in angle parameter(s). Choosing pairs having very long distance may cause problems in sense of for example error of the distance parameter and/or angle parameter(s) due to deformation of fingerprint at reading due to different pressure or tension against reading device, and/or causing the cluster to be inappropriate for comparison. Therefore, the upper and lower bounds are preferably set to appropriate support the implementation in sense of sensor size, resolution, quantization, etc.

Further, the solid lines indicate pairs where a match is found and the dashed lines indicate pairs where no match is found. In this example, five matching pairs are found, and these can consequently be seen both in the sample and the template illustration. These matching pairs form five links in the cluster and consequently the first five links in a supercluster to be built. It can also be observed that the pair with the lowermost minutia point did not match due to position and orientation although seeming close to hit, which may be a typical phenomenon of deformation upon acquiring the sample. Below, with reference to FIG. 6, it is indicated that this minutia point is involved with a match in a pair with another minutia point, which is possible when the relative deformation between those minutia points is less. This is one example where the link count gives a reasonable metric, i.e. the count is less than if no deformation occurred, but gives a contribution to the metric anyway to some, often close-by, minutia points forming matching pairs, and the resolution in the matching score of the supercluster is improved. An aspect of providing a score is further elucidated with reference to FIG. 10 below.

Upon selecting the first planet, one or a few criteria can be set. Since it is desirable to be able to build a supercluster that covers as much as possible of the minutiae of the fingerprint, choosing a planet from which only an isolated supercluster can be built should be avoided. This is of course hard to predict before the supercluster is built, but an inception can be to choose the first planet close to the centre of the image and/or a planet that provides a first matching cluster providing as many matching pairs as possible. The latter can imply that the first cluster is re-made with another planet if the first one gives a poor match. If several attempts give no or few matching pairs, the case can be that the fingerprints are not matching, and that can be output as a result directly without spending a lot of processing on building a poor supercluster that would clearly give a score that would not reach the threshold of match anyway. If the mismatch was due to a bad reading of the sample fingerprint, the user will then be able to make a new reading faster if a quick fail result can be provided.

Figure 12:
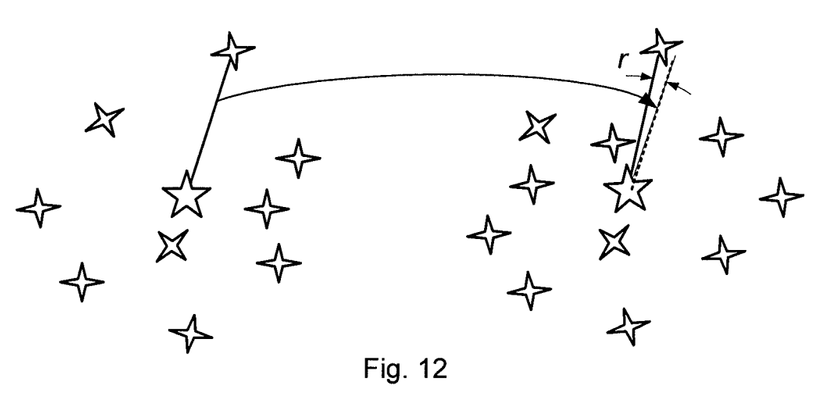
FIG. 12 illustrates two sets of minutiae that are to be compared, in which a systematic error of general direction of the pairs r is determined.

Further, the cluster of the sample is compared to a plurality of possible clusters of the template since difference in translation between the sample and template may be unknown. A likely cluster, i.e. providing enough of matching pairs, at a coarse initial matching, e.g. only based on general directions of pairs and possibly with an increased tolerance, can be selected for a more thorough comparison according to what has been demonstrated above. Alternatively, parallel inception comparisons can be made, where progress in matching for respective inception is evaluated, and lack of matching causes some of the parallel comparisons to stop, and finally only one, if there seems to be any match, remains and will form the first cluster. In addition to any of the alternatives above, a systematic error in general direction of the pairs can be taken into account as the processes progress to form a rotation calibrated comparison. In such case, instead of comparing for example $|\theta_s-\theta_t|<\Delta\theta$, a comparison can comprise $|\theta_s-\theta_t+r|<\Delta\theta$, where $\theta_s$ is angle of sample pair, $\theta_t$ is angle of template pair, $\Delta\theta$ is tolerance in angle for match, and r is determined systematic error in general direction of the pairs, i.e. rotation between sample and template, as is schematically illustrated for a pair in FIG. 12. The parameter r can for example be determined from one or several found good matches, and can help to enhance comparison further on in the process. In FIG. 12, a good match is illustrated between the minutia sets to be compared, but the error in general direction r is determined. This is illustrated by the general direction of the left set being illustrated also, as indicated by the arced arrow, in the right set as a dotted line. The angle between the dotted line and the general direction found in the right set, illustrated by a solid line, becomes an estimate of the error in general direction r. The illustration is schematic, and in practise the error in general direction r is preferably estimated from a plurality of good matches, e.g. by statistical analysis such as averaging or weighted averaging. Here, the weighting can be made based on metrics on the quality of the match for respective pair, i.e. difference in value of compared parameters.

For the comparisons, which can be numerous, the parameters to be compared for respective pairs are preferably calculated once and then stored in matrix form, which then is quickly accessed for each comparison.

Figure 5:
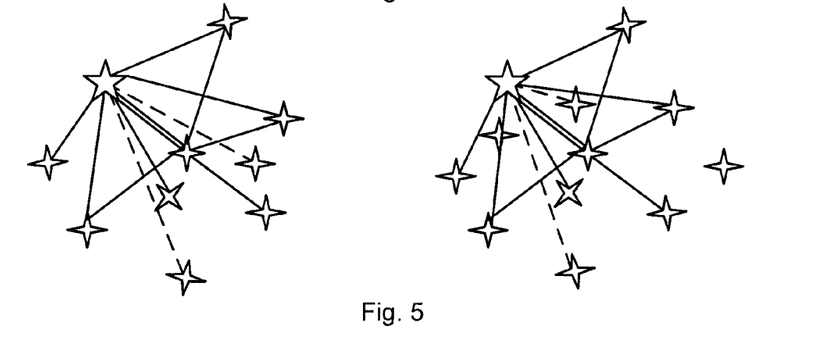
FIG. 5 illustrates the two sets of minutiae upon continuing building a supercluster by superaddition of cluster formed by further matching pairs.

FIG. 5 illustrates the two sets of minutiae in the next iteration, where another of the minutia points is selected as planet minutia point. The notation is the same as for FIG. 4. In the example, six matching pairs are found, and these can consequently be seen both in the sample and the template illustration. It is to be observed that one of the matching pairs were also present in the first matching illustrated in FIG. 4. Here, the decision to count that matching twice or not is a choice of implementation. The principle remains the same. These matching pairs form six more links, or five if implemented not to count the same match twice, in the cluster and consequently the eleven (or ten) links are superadded in the supercluster to be built.

When a satellite is chosen as the new planet, the comparison is somewhat different from the initial comparison, where all clusters of the template was considered. Instead, when a satellite is chosen as the new planet, comparison is only made with the cluster from the corresponding minutiae point of the template. This will make the process faster when continuing to build the supercluster.

Figure 6:
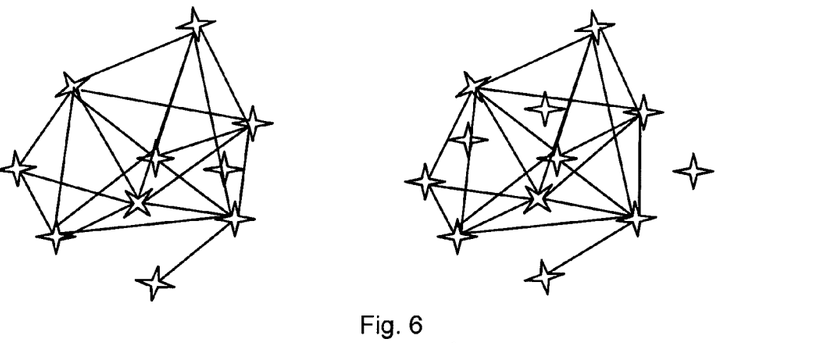
FIG. 6 illustrates the two sets of minutiae when the supercluster is built.

The procedure is iterated such that all of the minutia points, or at least all minutia points that have been a matching satellite minutia point to another planet minutia point, have been considered as a planet minutia point, or the formed supercluster reaches a predetermined size, and each found matching pair, i.e. formed link, is counted according to the principles elucidated above. This is illustrated in FIG. 6 as the built supercluster. In FIG. 6, the mutual matching pairs, i.e. where the links are present twice, are not illustrated for clarity reasons.

It is to be noted that there may be more than one supercluster in for example the sample. The reason for this can for example be that a part of the sample contain so much noise for example in a part that one continuous supercluster is not able to be formed. Another example where such issues can arise is when a so called swipe sensor, i.e. a sensor which the finger is swiped over such that a plurality of images are acquired from which the minutiae are extracted, is used and some of the acquired images lack recognisable minutiae. In such case, there is an option that for example two superclusters are formed, and their relation to each other, e.g. by angle and/or distance/direction, make them correspond to parts of the supercluster of the template. In such case, aggregate score can be calculated from the two or more superclusters, and that can still be enough for reaching the matching threshold.

Figure 7:
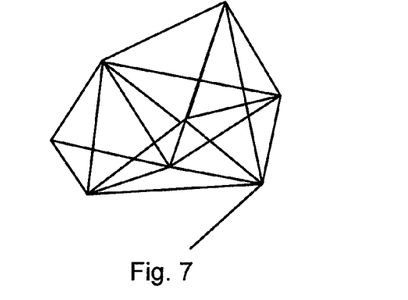
FIG. 7 illustrates the built supercluster per se.

FIG. 7 illustrates an example of a created supercluster. It should be noted that for the sake of easier understanding, the illustrated supercluster is made from a limited set of minutia points. In practice, the number of minutia points included for generating the supercluster is preferably also limited due to trade-off between performance in sense of achieving a reliable result and performance in sense of processing time and available processing power and/or power consumption. The limitation can be achieved, when having a large amount of minutia points available both in the template and in the sample, by building the supercluster until a desired size is achieved, or by limiting the amount of minutia points in the template and/or the sample before commencing the matching. For example, the number of minutia points of the supercluster can be limited to about 64 by any of the approaches demonstrated above, which has proven to give a good trade-off in performance.

FIG. 7 represents the supercluster only by its links, since the information about the respective minutia points of the sample and template sets no longer is needed for the determination whether there is a match or not between the sample and the template. From the built supercluster link configuration, a decision whether the sample and the template match can be taken. The decision is basically taken on a score based on the aggregate number of links, which is compared to a score threshold. For further enhancing the score calculation, further aspects of the supercluster can be considered. For example, the calculation of the score further comprises calculating a tension parameter of the supercluster and basing the score also on the calculated tension parameter, where tension here means the size of an array for representing the supercluster. Here, the meaning of "further comprise", as also below, be seen as "in addition to the link count", which is the basis for score calculation in all the given examples. The calculation of the score can also, or alternatively, further comprise calculating an area of the supercluster and basing the score on the calculated area. Here, the area of the supercluster can be calculated as a minimum rectangle to enclose the supercluster, i.e. min/max x/y for extremes of minutia points included in supercluster. Alternatively, the area can be calculated as a true area of the supercluster, which however becomes a more complex calculation operation. Still further, the calculation of the score can also, or alternatively, further comprise calculating a mean number of minutia points in the sets and basing the score on the calculated mean number of minutia points, which means that larger sets are given a different score than smaller sets. This can be combined or replaced by calculating the number of minutia points in the supercluster and basing the score on the calculated number of minutia. The combined calculation can include forming a ratio between the number of minutia points of the built supercluster and the number of minutia points of the sets, where the number of minutia points can be the number of minutia points of the sample, of the template, or a mean or sum of the number of minutia points of the sample and template. The way of actually counting the score is preferably decided based on the implementation. For example, the score is calculated as a quota comprising in its numerator a product comprising the number of counted links, the tension parameter and the area of the supercluster, and in its denominator a product comprising the squared mean number of minutia points in the sets and the squared number of minutia points in the supercluster. This example has been found to give a proper balance between the different parameters which is suitable also to high-end solutions where performance both in sense of reliability, such as false rejection rate and false acceptance rate, and in sense of computing effort on scarce resources, i.e. to provide fast processing also on e.g. portable devices.

Figure 8:
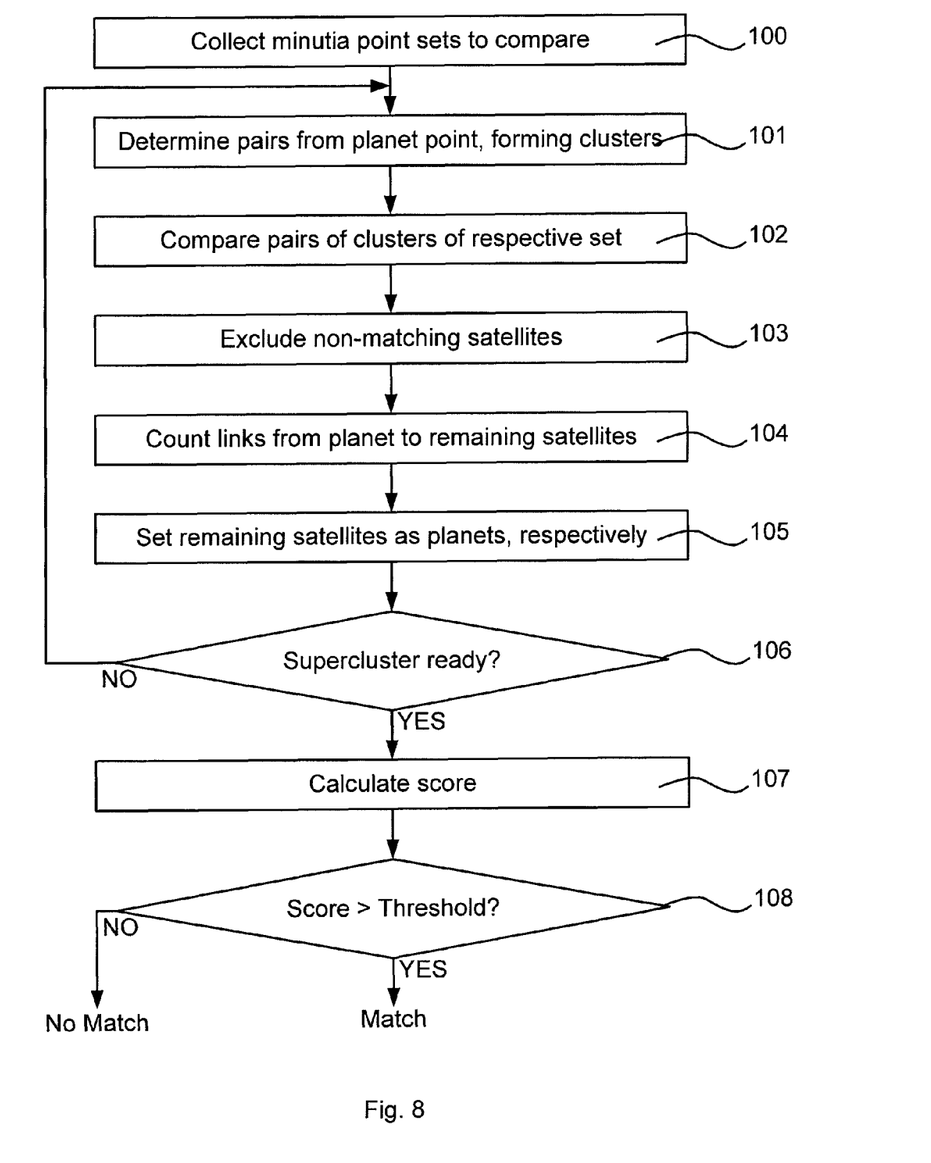
FIG. 8 is a flow chart illustrating a method.

FIG. 8 is a flow chart illustrating a method of matching fingerprints according to an embodiment. In a minutia point set collection step 100, a minutia point set to be compared is collected, and at least one other minutia point set is also collected to be compared with. Here, one other minutia point set is collected when a pure matching is to be performed, e.g. for authenticating a user, and a plurality of other minutia point sets are collected when an identification is to be performed in addition to the matching. The term collecting can mean different things depending to the implementation. For the minutia point set to be compared, the collecting can comprise reading a fingerprint image from a sensor and extracting the minutia point set from the acquired image. The fingerprint image can be presented from another entity or context, where the collecting comprises receiving or accessing the fingerprint image and extracting the minutia point set from it. Further, the minutia point set can be presented from another entity or context, where the collecting comprises receiving or accessing the minutia point set, hereafter called the sample. Similar, for the other minutia point set or sets, hereafter called the template, the information is received or accessed from e.g. a server, memory or data carrier. It is to be noted, for the case a plurality of templates are in question, the steps until a score is calculated can be considered as parallel processes for each template. Here, the processes can be aborted in the course of time when link counting scores, as will be elucidated below, do not grow satisfactory to save processing power. An identified and matching template can be determined in the end after scores are determined, respectively.

The process will now be described as a matching of a sample to a template, but it should be understood that the principle of one sample to many templates follows the same approach, as indicated above.

In a pair determination step 101, pairs are determined from a determined planet minutia point to other minutia points being satellite minutia points, as demonstrated with reference to FIGS. 2 to 7. A cluster emanating from this planet minutia point is thus formed for respective set of minutia, i.e. for the sample and the template. In a comparison step 102, the respective pairs of the clusters of the respective sets are then compared, similar to what is demonstrated with reference to FIG. 3. Non-matching satellites are excluded from the cluster in exclusion step 103, and the remaining pairs, i.e. the links, are counted in a link counting step 104. The link count is stored such that an aggregate link count is available after proper iterations. A new minutia point is then set to be the planet minutia point in step 105, and unless a supercluster is considered to be ready in a supercluster finished checking step 106, based on any criterion as of those demonstrated above with reference to FIG. 7, the procedure returns to perform steps 101 to 104 from the point of view of the new planet minutia point. If the supercluster is considered ready in step 106, the process continues to a score calculation step 107, where the aggregate number of link counts plays the dominant role. Other parameters may also be included, as demonstrated above with reference to FIG. 7. The determined score is compared with a threshold in match determination step 108, and if the score exceeds the threshold, a match is considered to be present.

For the case of comparison of a sample with multiple templates, the template for which the sample gains the highest score is compared with the threshold, and the procedure of matching is performed accordingly.

Figure 9:
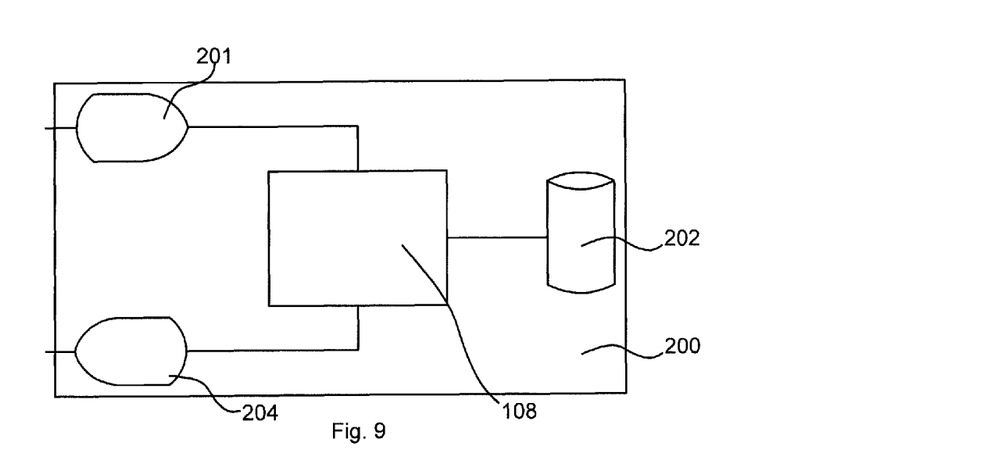
FIG. 9 is a block diagram schematically illustrating an apparatus.

FIG. 9 schematically illustrates a biometric matching apparatus 200 comprising a receiver 201 for receiving a first set of minutia points of a fingerprint reading, a memory access circuit 202 arranged to access a memory holding at least a second set of minutia points of a fingerprint template, and a processing device 203 connected to the receiver 201 and the memory access circuit 202, and arranged to determine whether the first set of minutia points match the second set of minutia points, and providing an output, depending on the result, via a transmitter 204.

The receiver 201 should be broadly construed to be a functional element arranged to collect a set of minutia points representing a biometric sample. The collecting can comprise reading a fingerprint image from a sensor and extracting the minutia point set from the acquired image, and in such case the receiver 201 comprises a biometric sensor and an extraction circuit. The biometric sample, e.g. a fingerprint image, can be presented from another entity or context, where the collecting comprises receiving or accessing the fingerprint image and extracting the minutia point set from it, and in such case the receiver 201 comprises a communication circuit, for wired or wireless communication, for receiving the image data, and an extractor circuit. Further, the minutia point set can be presented from another entity or context, where the collecting comprises receiving or accessing the minutia point set, and in such case the receiver 201 comprises a communication circuit, for wired or wireless communication, for receiving the minutia point data.

The memory access circuit 202 which is arranged to access a memory holding at least a second set of minutia points of a fingerprint template may be comprised in the processing device 203 or in a memory, and should be functionally construed. The memory can be a server, a volatile memory temporarily storing the one or more templates during the matching, a non-volatile memory, e.g. on a data carrier, forming a part of an identification item, or other data holding equipment suitable for the implementation in question. In certain cases, the memory may be a part of the processing device 203, which can be particularly suitable when template is to be kept secret, and the processing device 203 is enabled to store the template in a secure memory area on its chip. This will make it more or less impossible to tamper or steal the data.

The transmitter 204 should also be functionally construed, and may be a part of the processing device 203, where for example a secret, such as an access, authentication or decryption key, is "transmitted" internally in the processing device or its peripheral devices to enable a certain function upon match.

The processing device 203 can be, depending on the implementation and its purpose, anything from an embedded processor of a smart card to a nation or world wide data network, e.g. for financial, intelligence, infrastructural, or other purposes gaining benefit from matching or identification of biometrics, and there between personal computing or portable communication devices gaining benefit by e.g. replacing passwords and identification numbers with convenient biometric solutions.

The biometric matching apparatus 200 is arranged, by its functional elements 201-204, to implement the functions demonstrated above with reference to FIGS. 2 to 8.

Figure 10:
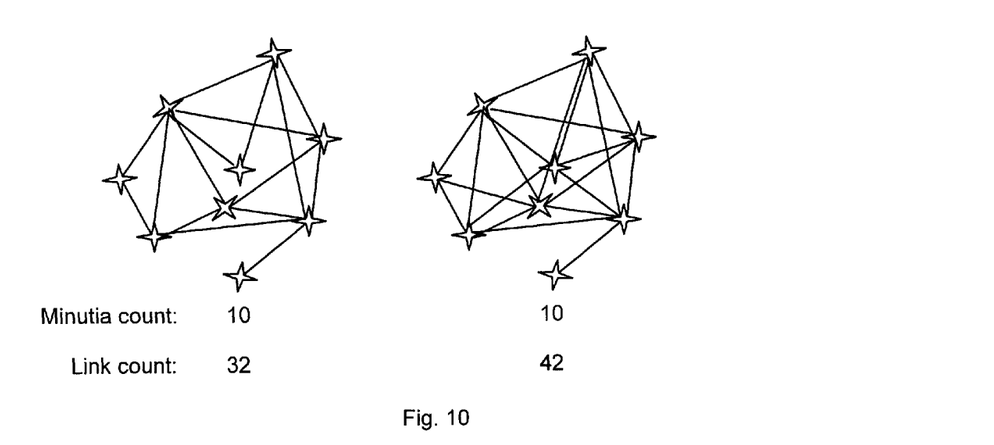
FIG. 10 illustrates a comparison between two formed superclusters, and their similarities and differences in sense of observed metrics.

FIG. 10 illustrates two comparable superclusters, each formed from a comparison between a sample and a template, and differences in metrics gained from different approaches of counting scores. Both superclusters have ten found minutia points included in the respective matching pairs. If only the number of minutia points were to be used as a metric on the matching, the two would be equal. However, the left supercluster would, by employing a link count approach, have 32 counted links. It can be noted here, that found pairs are allowed to be counted twice in this example when first one minutia point of a pair is considered to be planet minutia point, and then the other of the pair. The right one have more matching pairs, and thus 42 links have been counted. The agreement between the sample and template were in the right case larger than in the left case although the same number of matching minutia points were identified. From this, it can be seen that a link count approach gives a finer granularity of matching score, which has been found to improve matching and identification.

Figure 11:
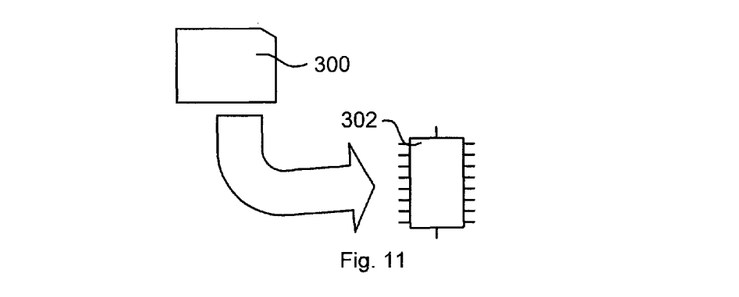
FIG. 11 illustrates a non-transitory computer-readable medium and a processing means.

The methods according to the present invention are suitable for implementation with aid of processing means, such as computers and/or processors. Therefore, there is provided computer programs, comprising instructions arranged to cause circuit or circuits of the processing means, processor, or computer to perform the steps of any of the methods according to any of the embodiments described with reference to FIG. 8, taken in light of the principles described with reference to FIGS. 2 to 7. The computer programs preferably comprises program code which is stored on a computer readable medium 300, which can be non-transitory as illustrated in FIG. 11, and which can be loaded and executed by a processing means, processor, or computer 302 to cause circuit or circuits thereof to perform the methods, respectively, according to embodiments of the present invention, preferably as any of the embodiments described with reference to FIGS. 2 to 8. The computer 302 and computer program product 300 can be arranged to execute the program code sequentially where actions of the any of the methods are performed stepwise. The processing means, processor, or computer 302 is preferably what normally is referred to as an embedded system. Thus, the depicted computer readable medium 300 and computer 302 in FIG. 11 should be construed to be for illustrative purposes only to provide understanding of the principle, and not to be construed as any direct illustration of the elements.

The invention has been made in the context of matching fingerprints. The use of the principles may equally well be used for other matching operations where biometric data, represented as features, i.e. minutiae points, and their relation to each other, is to be compared, such as in the context of finger vein pattern, iris, palm or foot prints, dental identification, etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for matching fingerprints by determining if a first set of minutia points from a first fingerprint reading and a second set of minutia points from a second fingerprint reading emanate from fingers which are idem, the method comprising a processing device performing the steps of:
   assigning a first minutia point in both the first set and second set of minutia points as a planet minutia point;
   a) within both the first set and second set of minutia points, determining pairs including the planet minutia point and satellite minutia points, such that a cluster is formed around the first minutia point with the satellite minutia points, wherein each pair represents the planet minutia point and one of the satellite minutia points;
   b) comparing the cluster of the first set of minutia points to the cluster of the second set of minutia points to determine satellite minutia points in the first set of minutia points that match satellite minutia points in the second set of minutia points, wherein each of the matching satellite minutia points is part of a given pair in the first set of minutia points with features matching features of a given pair in the second set of minutia points;
   c) counting links in the cluster formed by pairs including the planet minutia point and each of the matching satellite minutia points; and
   d) for the matching satellite minutia points, performing steps a) to c) with respective matching satellite minutia points assigned as planet minutia points in order to form a supercluster by iterating steps a) to d) and superadding the clusters of each iteration wherein link count is stored such that an aggregate link count is available after the iteration such that the aggregate link count is achieved as the supercluster is built;
   calculating a score of the supercluster based on the aggregate counted links; and
   comparing the score with a threshold, wherein the respective fingerprint readings are considered to emanate from fingers which are idem if the score is greater than or equal to the threshold.

2. The method according to claim 1, wherein the iterating of steps a) to d) in step d) is performed until the formed supercluster reaches a predetermined size or no further minutia points of the sets remain.

3. The method according to claim 1, wherein the matching features of the pairs comprises a set of parameters including any of
   distance between planet minutia point and satellite minutia point;

relative angle between planet minutia point and satellite minutia point; and relative angle between a reference angle and an angle of any of the planet minutia point and satellite minutia point, or any combination of these.

4. The method according to claim 1, wherein the calculation of the score further comprises calculating a tension parameter of the supercluster and basing the score on the calculated tension parameter.

5. The method according to claim 1, wherein the calculation of the score further comprises calculating an area of the supercluster and basing the score on the calculated area.

6. The method according to claim 1, wherein the calculation of the score further comprises calculating a mean number of minutia points in the first set and the second set and basing the score on the calculated mean number of minutia points.

7. The method according to claim 1, wherein the calculation of the score further comprises calculating the number of minutia points in the supercluster and basing the score on the calculated number of minutia.

8. The method according to claim 1, wherein the first minutia point in both the first set and second set of minutia points assigned as the planet minutia point is selected close to a centre of the first fingerprint reading and the second fingerprint reading, respectively.

9. The method according to claim 1, wherein the first minutia point in both the first set and second set of minutia points assigned as the planet minutia point is selected such that a first cluster comprises as many matching satellite minutia points as possible, wherein the method further comprises repeating steps a)-c) with another minutia point if no or few matching satellite minutia points are determined for a previously selected first minutia point.

10. A non-transitory computer readable medium storing a computer program comprising computer executable instructions, which instructions cause a computer to, when downloaded to and executed on a processor of the computer, perform the method according to claim 1.

11. A biometric matching apparatus comprising:

a receiver for receiving a first set of minutia points of a fingerprint reading;

a memory access circuit arranged to access a memory storing at least a second set of minutia points of a fingerprint template; and a processing device connected to the receiver and the memory access circuit, and arranged to determine whether the first set of minutia points matches the second set of minutia points by:

assigning a first minutia point in both the first set and second set as a planet minutia point;

a) within both the first set and second set of minutia points, determining pairs including the planet minutia point and a satellite minutia points such that a cluster is formed around the first minutia point with the satellite minutia points, wherein each pair represents the planet minutia point and one of the satellite minutia points;

b) comparing the cluster of the first set of minutia points to the cluster of the second set of minutia points to determine satellite minutia points in the first set of minutia points that match satellite minutia points in the second set of minutia points, wherein each of the matching satellite minutia points is part of a given pair in the first set of minutia points with features matching features of a pair in the second set of minutia points;

c) counting links in the cluster formed by pairs including the planet minutia point and each of the matching satellite minutia points; and d) for the matching satellite minutia points, perform a) to c) with respective matching satellite minutia point assigned as planet minutia points in order to form a supercluster by iteration of steps a) to d) and super-addition of the clusters of each iteration wherein link count is stored such that an aggregate link count is available after the iteration such that the aggregate link count is achieved as the supercluster is built;

calculating a score of the supercluster based on the aggregate counted links;

comparing the score with a threshold, wherein the respective fingerprint reading and template are considered to emanate from fingers which are idem if the score is greater than or equal to the threshold; and providing an output indicating whether the fingerprint reading and template match.

12. The apparatus according to claim 10, wherein the matching features of the pairs comprises a set of parameters including any of distance between planet minutia point and satellite minutia point;

relative angle between planet minutia point and satellite minutia point; and relative angle between a reference angle and an angle of any of the planet minutia point and satellite minutia point, or any combination of these.

13. The apparatus according to claim 11, wherein for the calculation of the score, the processing device is further arranged to calculate a tension parameter of the supercluster and base the score on the calculated tension parameter.

14. The apparatus according to claim 11, wherein for the calculation of the score, the processing device is further arranged to calculate an area of the supercluster and base the score on the calculated area.

15. The apparatus according to claim 11, wherein for the calculation of the score, the processing device is further arranged to calculate a mean number of minutia points in the first set and the second set and base the score on the calculated mean number of minutia points.

16. The apparatus according to claim 11, wherein for the calculation of the score, the processing device is further arranged to calculate the number of minutia points in the supercluster and base the score on the calculated number of minutia.

17. The apparatus according to claim 11, wherein the first minutia point in both the first set and second set of minutia points assigned as the planet minutia point is selected close to a centre of the fingerprint reading and the fingerprint template, respectively.

18. The apparatus according to claim 11, wherein the first minutia point in both the first set and second set of minutia points assigned as the planet minutia point is selected such that a first cluster comprises as many matching satellite minutia points as possible, wherein the processing device is arranged to repeat steps a)-c) with another minutia point if no or few matching satellite minutia points are determined for a previously selected first minutia point.

19. A portable data carrier comprising:

a non-transitory computer readable memory storing a template of a fingerprint represented by a set of minutia points of a reference fingerprint;

a matching apparatus according to claim 11, wherein the memory access circuit is connected to the memory and is arranged to determine if the first set of minutia points and the set of minutia points of a reference fingerprint emanates from idem finger; and a security mechanism is unlocked when the output indicates that the fingerprint reading and template match.

20. A data processing unit comprising a matching apparatus according to claim 11, wherein:

the accessed memory is a database comprising a plurality of templates for a plurality of fingers, respectively, and the data processing unit is arranged to determine, from a calculated score for each of the templates, the template that the fingerprint reading most resembles.

21. The data processing unit according to claim 20, further being arranged to determine if the fingerprint reading and the template most resembling the fingerprint reading are from fingers which are idem by comparing the score of the template most resembling the fingerprint reading with a threshold.

* * * * *